SAMUEL SNIDER.
Improvement in Cultivators.
No. 120,789.  Patented Nov. 7, 1871.
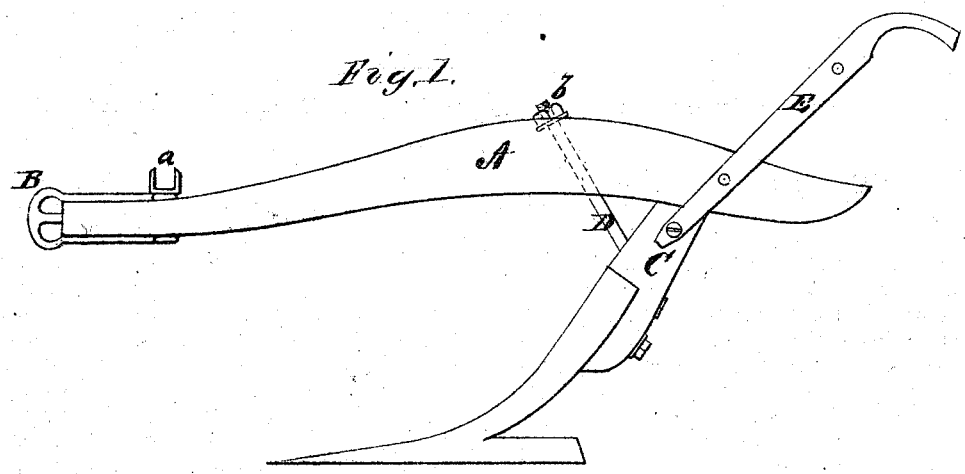
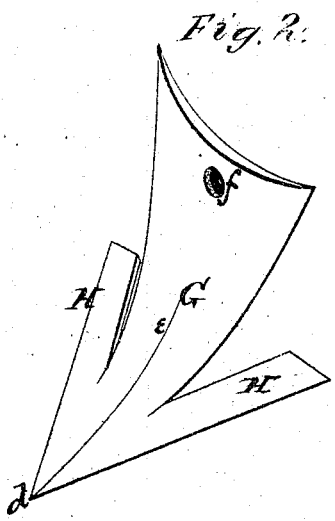

UNITED STATES PATENT OFFICE.

SAMUEL SNIDER, OF TAYLORSVILLE, KENTUCKY, ASSIGNOR TO HIMSELF, A. P HARCOURT, AND G. H. STONE, OF SAME PLACE.

IMPROVEMENT IN CULTIVATORS.

Specification forming part of Letters Patent No. 120,789, dated November 7, 1871.

*To all whom it may concern:*

Be it known that I, SAMUEL SNIDER, of Taylorsville, in the county of Spencer and State of Kentucky, have invented certain new and useful Improvements in Plows; and I do hereby declare that the following is a full, clear, and exact description thereof, reference being had to the accompanying drawing and to the letters of reference marked thereon, which form a part of this specification.

The nature of my invention consists in the construction and arrangement of the parts of a cultivator-plow, as will be hereinafter more fully set forth.

In order to enable others skilled in the art to which my invention appertains to make and use the same, I will now proceed to describe its construction and operation, referring to the annexed drawing, in which—

Figure 1 is a side view of the entire plow, and Fig. 2 is a perspective view of the plow proper.

A represents a plow-beam, constructed in any of the known and usual ways, and provided at the front end with a clevis, B, which is secured in place by means of a set-screw, $a$, as shown in Fig. 1. To the under side of the beam A, near the rear end, is suitably attached a short plow-stock, C, braced by means of a headed rod, D, which is passed through the stock and up through the beam and fastened on the upper side thereof by a nut, $b$. E E represent the handles, suitably attached to the plow-beam and plow-stock, as shown. G represents the cultivator-shovel, constructed as shown in Fig. 2, having a central ridge from the point $d$ to the bend of the shovel at $e$, the sides sloping downward from said central ridge, while above the bend at $e$ the shovel is rounded or convex on the outer surface. In the center, near the upper edge of the shovel, is a hole, $f$, for the passage of a bolt to fasten the shovel to the plow-stock C, said bolt being secured by a nut on the rear side of said stock. On the sides of the shovel G are formed wings H H, forming a straight continuation of the front end of the shovel, said wings being inclined at about the same angle as the shovel is at the point where the wings separate from the same. From the point at which the wings separate it will be observed that the shovel gradually widens, as seen in Fig. 2.

This cultivator-plow or shovel is not intended for breaking up ground or turning over sod; but the design is to run close to the corn, cotton, &c., to loosen the dirt and leave it so that it will not wash.

Having thus fully described my invention, what I claim as new, and desire to secure by Letters Patent, is—

The shovel G, having a central ridge, $d\ e$, the sides being sloped and furnished with wings H H, while the upper portion of the shovel is rounded in cross-section, and is gradually widened out above the point at which the wings diverge, as shown and described.

In testimony that I claim the foregoing as my own I affix my signature in presence of two witnesses.

SAMUEL SNIDER.

Witnesses:
 JNO. S. HOWARD,
 ABRAM ANDERSON.

(43)